United States Patent
Datcuk, Jr. et al.

[11] Patent Number: 6,039,279
[45] Date of Patent: Mar. 21, 2000

[54] PUSH BUTTON CLICK MECHANISM

[76] Inventors: Peter Datcuk, Jr., 209 Center St., Apt. 3, Sewell, N.J. 08080; Lou Duarte, 608 Alburger Ave., Philadelphia, Pa. 19155

[21] Appl. No.: 09/222,510

[22] Filed: Dec. 29, 1998

[51] Int. Cl.[7] .................................................. A01K 89/02
[52] U.S. Cl. ............................................ 242/296; 242/299
[58] Field of Search .................................... 242/296, 299, 242/306, 307, 308

[56]                    References Cited

U.S. PATENT DOCUMENTS

| | | | |
|---|---|---|---|
| 386,705 | 7/1888 | Graham | 242/307 X |
| 2,116,581 | 5/1938 | Moor | 242/296 |
| 2,478,111 | 8/1949 | Kilian | 242/307 X |
| 2,578,978 | 12/1951 | Mandolf et al. | 242/296 |
| 3,827,649 | 8/1974 | Payen | 242/296 |
| 4,288,046 | 9/1981 | Morimoto et al. | 242/299 X |
| 4,540,135 | 9/1985 | Uetsuki et al. | 242/296 |
| 5,556,050 | 9/1996 | Baisch et al. | 242/296 |

FOREIGN PATENT DOCUMENTS 310994   5/1929   United Kingdom ................... 242/296

*Primary Examiner*—Donald P. Walsh
*Assistant Examiner*—Emmanuel M. Marcelo
*Attorney, Agent, or Firm*—Frank Benasutti

[57]                   ABSTRACT

A push button click mechanism for a fishing reel comprises a device such that when a button is bushed, the click mechanism is engaged and when the button is pushed again, the click mechanism is disengaged.

11 Claims, 11 Drawing Sheets

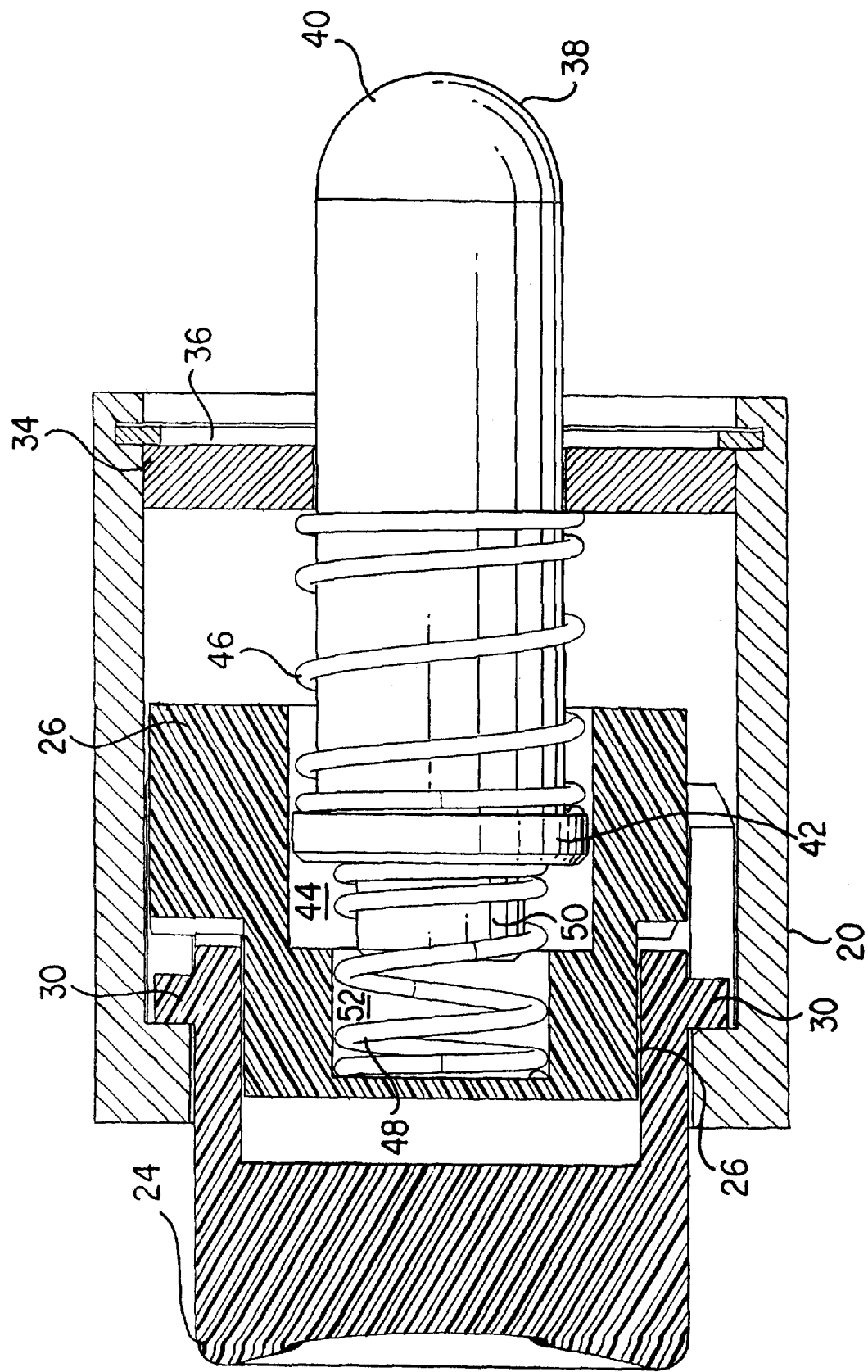

PUSH BUTTON CLICK MECHANISM

BACKGROUND OF THE INVENTION

1. Field of the Invention

This invention relates to click mechanisms for fishing reels and, in particular, such mechanisms which have a push button to both activate and deactivate the clicker.

2. Description of the Prior Art

Click mechanisms are known in the prior art. See, for example, U.S. Pat. No 5,556,050 for a variable click mechanism for the lever drag reel and the prior art noted therein. Basically, the click mechanism is activated to push a click pin into engagement with a rotating plate which has detents or holes therein to engage the pin intermittently. As the plate rotates, the mechanism makes a clicking noise; hence, the term click mechanism.

SUMMARY OF THE INVENTION

In accordance with the preferred embodiment of our invention, we provide a simple and efficient mechanism for engaging and disengaging a click mechanism by simply pushing on a button. In accordance with the invention, if you push on a button once, the click mechanism is engaged. Thereafter, if you push the button again, the click mechanism is disengaged.

We have invented an improvement in a fishing reel having a click mechanism, which improvement comprises a push button means for engaging said click mechanism to engage the click and to disengage the click. The click mechanism comprises a click pin and plate positioned such that the click is engaged when said pin is engaged with said plate and disengaged when the pin does not engage said plate. Our push button means comprises, a button means mounted on the reel having a button for inward and outward axial movement; a selector means mounted within the reel and positioned to be engaged by the button means for axial movement in response to axial movement of the button means; and further positioned to engage said click pin to cause movement thereof in response to movement of the selector means. The push button means has first rotational restraint means engaging the button means and the reel to restrain the rotation of that portion of the button means which engages the selector means. The first rotational restraint means, comprises at least and most preferably a plurality of keys or tabs in a slot or slots.

The button means further comprises a plurality of teeth extending inwardly into the reel. The selector means also has a plurality of teeth juxtaposed to the teeth of said button means so as to be engaged thereby upon inward axial movement of said button means. The teeth of the button means and the teeth of the selector means are rotationally offset so that upon axial movement of the button means, the teeth of said button means and the selector means engage.

The push button means has a second rotational restraint means engaging the selector means and the reel to restrain the rotation of the selector means while permitting axial movement thereof Upon further axially inward movement of said button means, the second rotational restraint means is disengaged and the selection means is rotated.

The push button means has a third rotational restraint means engaging the selector means and the reel to prevent further rotation of the selector means while the click is engaged. Upon further axially inward movement of said button means, the third rotational restraint means is disengaged and the selection means is rotated to a position wherein it can be moved axially outwardly and the click will be, thereby, disengaged.

The push button means has two springs. A lower strength spring means are provided engaging said selector means to exert an outwardly directed force thereon to cause rotation of the selector means, axial movement of said selector means and disengagement of said click.

A higher strength spring means is provided engaging the selector means to exert an inwardly directed force thereon to cause engagement of the click.

BRIEF DESCRIPTION OF THE DRAWINGS

FIG. 12 is an axial section of a portion of the device shown in the prior figures.

DESCRIPTION OF THE PREFERRED EMBODIMENTS

Figure 1:
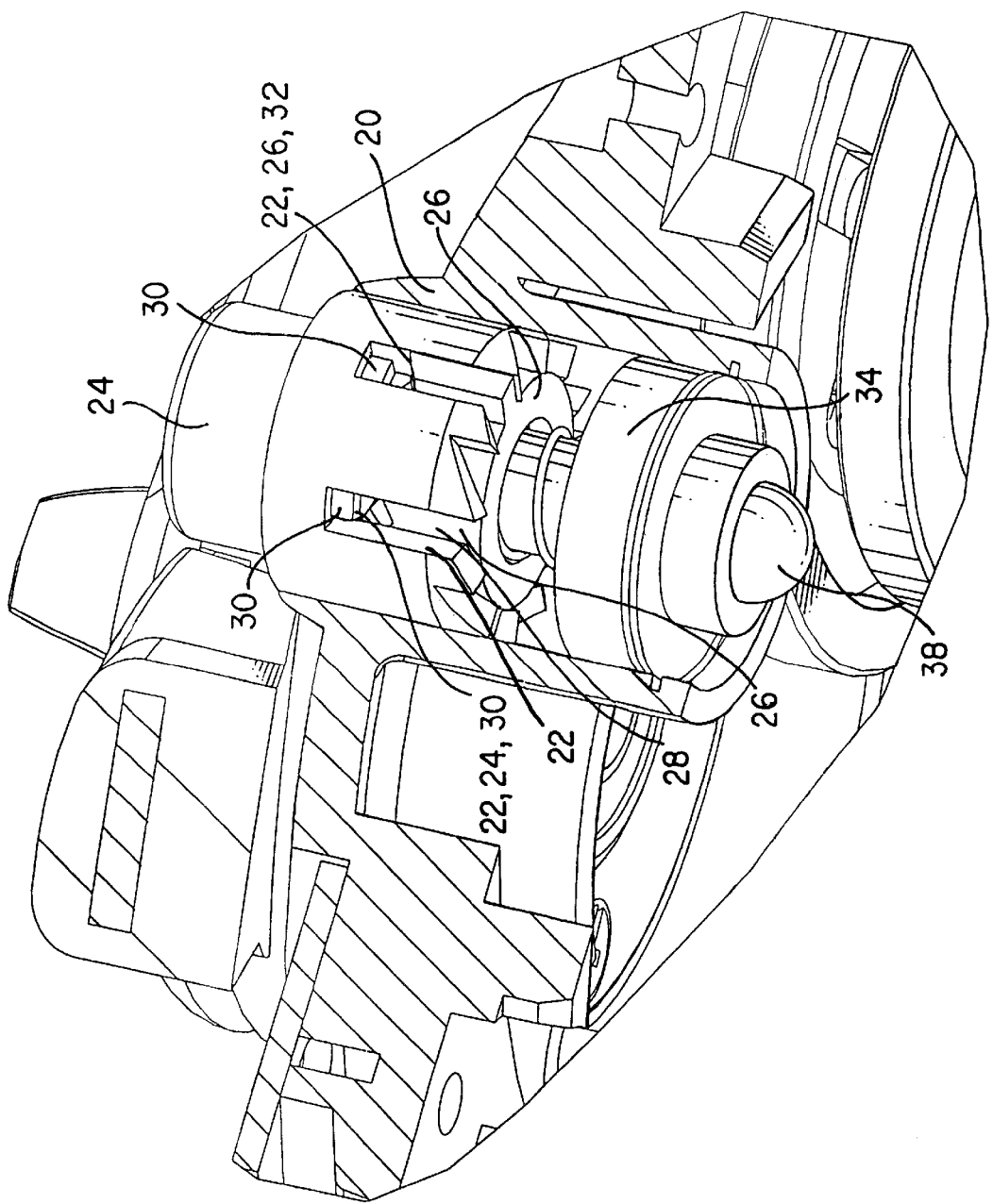
FIG. 1 is a perspective view partially broken away of a portion of a fishing reel showing our invention.

Referring to the Figures, our push button click mechanism comprises a push button means having housing 20 fixedly mounted in a fishing reel (by any suitable means not shown) and comprising, in part, a substantially cylindrical cage 22 mounted therein. Within the cage 22 is a button means having button 24 and a selector means or plunger 26. The cage 22 is part of the housing as shown, but can be a separate part, either press fitted or retained in some other way in the housing. The cage 22 has longitudinally extending peripheral slots 28; open at one end facing into the reel and terminating at a shoulder at the other end. First, restraining means are provided comprising a button 24 which has radially extending peripheral tabs 30 dimensioned and positioned to extend into and be guided by slots 28 to thereby prevent rotation of at least the bottom portion of the button 24 (the button means could be in two parts) while simultaneously allowing for axial movement of said button 24 into and out of the reel. These tabs 30 abut the shoulders at the ends of the slots 28 when the button is fully extended outwardly of the reel, as shown in FIG. 1.

The selector 26 has a plurality of radially and longitudinally projecting peripheral tabs 32 which are dimensioned and positioned within the slots 28 of the cage 22, so as to slide longitudinally therein, while preventing rotation of the selector 26 when engaged with the cage 22, as shown in FIG. 1.

At the innermost end of the housing 20 remote from the button 24, there is guide bushing or retaining washer 34 which is retained in the housing by retaining ring 36, FIG. 12. Positioned to slide axially through a hole in this guide bushing 34 is a click pin 38 which has an outboard semi-spherical end 40 for engagement with the click plate (not shown, but conventional per se). The inboard end of the click pin 38 comprises a shouldered portion 42 which is positioned to slide axially within a cylindrical bore 44 in the selector 26. A light weight return spring 46 is mounted about the click pin 38 and positioned between and bearing upon the shoulder 42 and the guide bushing 34. A heavy weight click spring 48 is positioned about a cylindrical axial extension 50 of the click pin 38 between the other surface of the shoulder 42 and a cylindrical bore 52 in the selector 26; to apply force between the end 40 of the click pin 38 and the click plate.

OPERATION OF THE DEVICE

As shown in FIGS. 1 and 12, the click mechanism is in the retracted position, that is, the click pin 38 does not engage the click plate of the reel.

Figure 3:
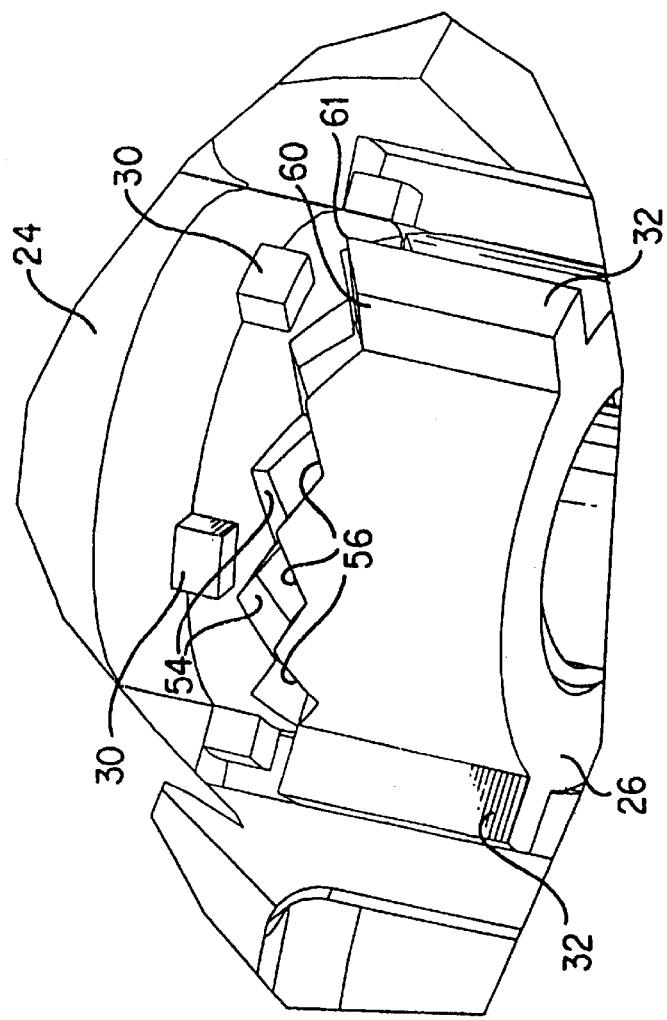
FIG. 3 is a perspective view partially broken away of a portion of the reel.
Figure 2:
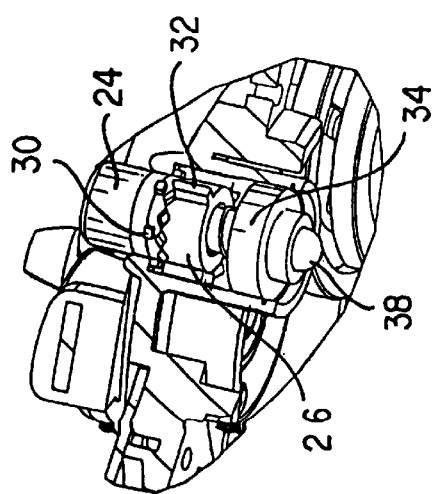
FIG. 2 is a perspective view on a smaller scale, partially broken away, of a portion of the reel shown in FIG. 1.
Figure 4:
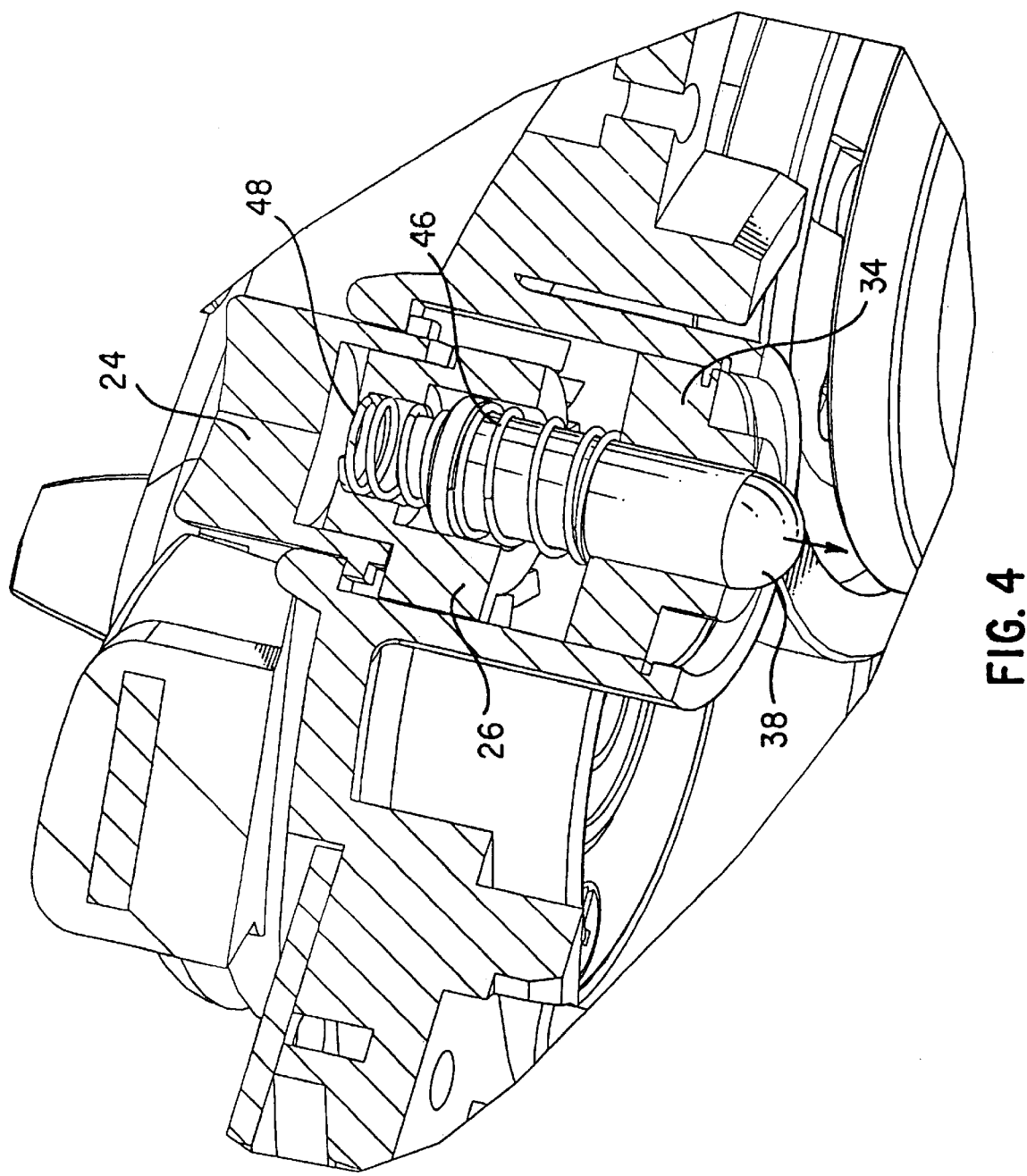
FIG. 4 is a perspective view partially broken away of a portion of the reel.
Figure 5:
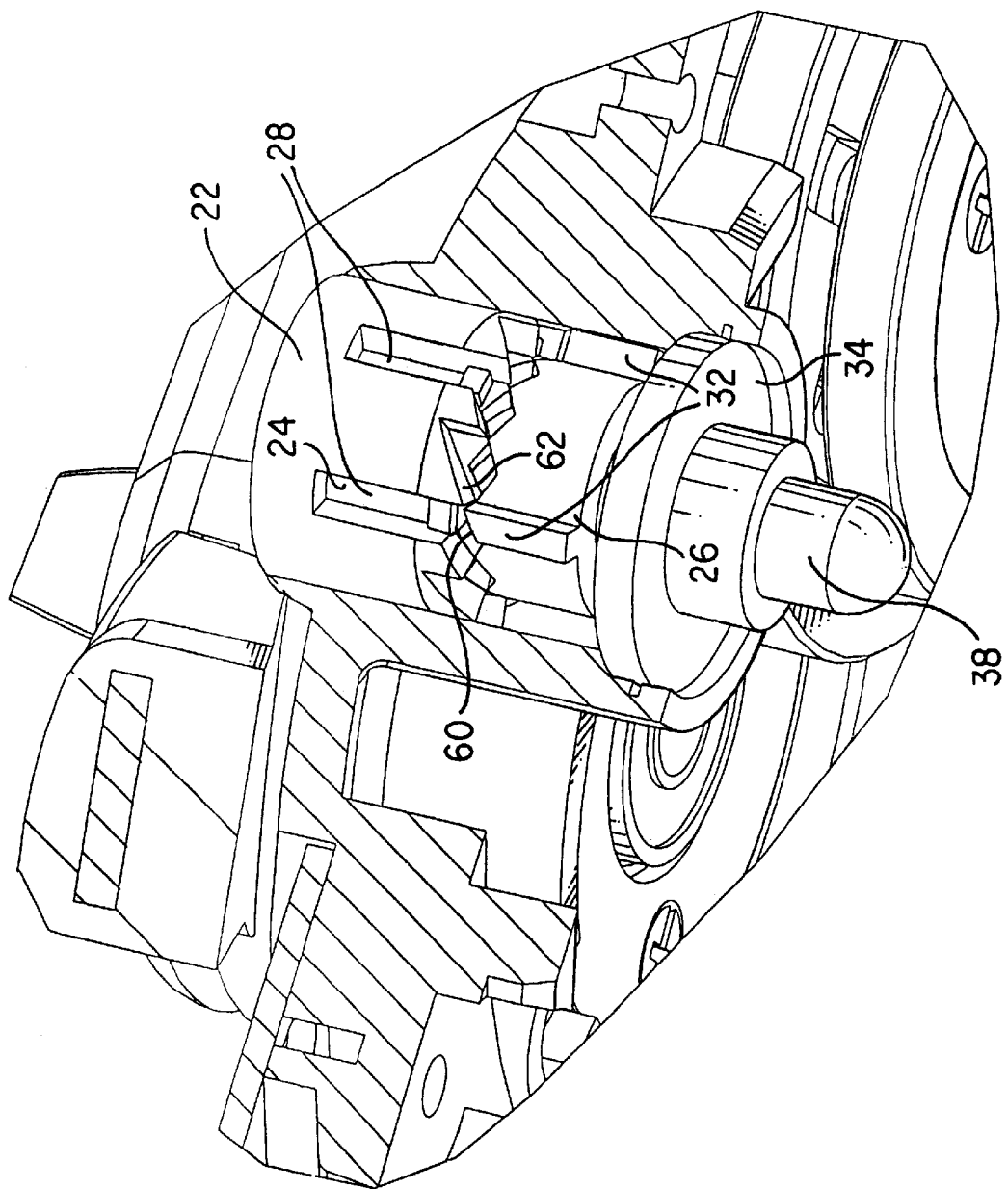
FIG. 5 is a perspective view partially broken away of a portion of the reel.

FIGS. 2 and 3 show the same components in the same position with portions of the cage 22 removed. Teeth having ramps are provided on the button, the selector and the cage. The ramps 54 are built into the innermost end of the button 24 and the ramps 56 are built into the outermost end of the selector 26. These figures illustrate how these ramps 54, 56 are arranged offset relative to one another. This arrangement is critical for the device to work. A second rotational restraint means prevents rotation of the selector means while it is moving inwardly. When the button 24 is pressed inwardly, the ramps 54 engage the ramps 56 and the button moves the selector 26 axially inwardly until the selector's tabs 32 move clear of the slots 28 in the cage 22 as shown in FIG. 5. When the tabs 32 clear the slots 28, the selector 26 is free to rotate. The rotational force is provided by a combination of the light return spring means 46 maintaining outwardly directed pressure on the selector and the ramps 56 on the selector sliding on the ramps 54 on the bottom of the button 24. This clockwise rotation continues until the ramps 62 on the cage and the ramps 60 on the selector are in position to mesh (see FIG. 5).

Figure 6:
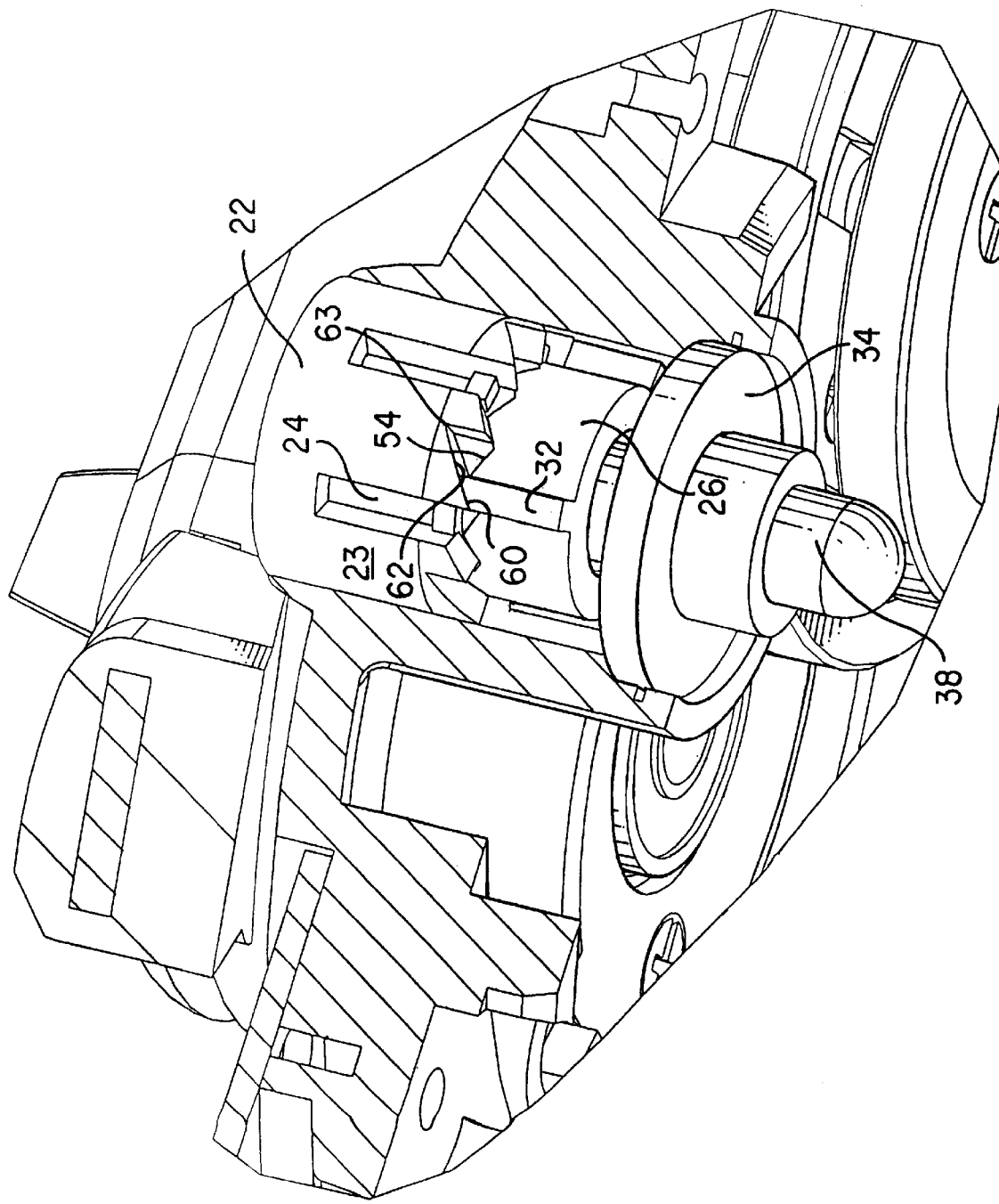
FIG. 6 is a perspective view partially broken away of a portion of the reel.
Figure 7:
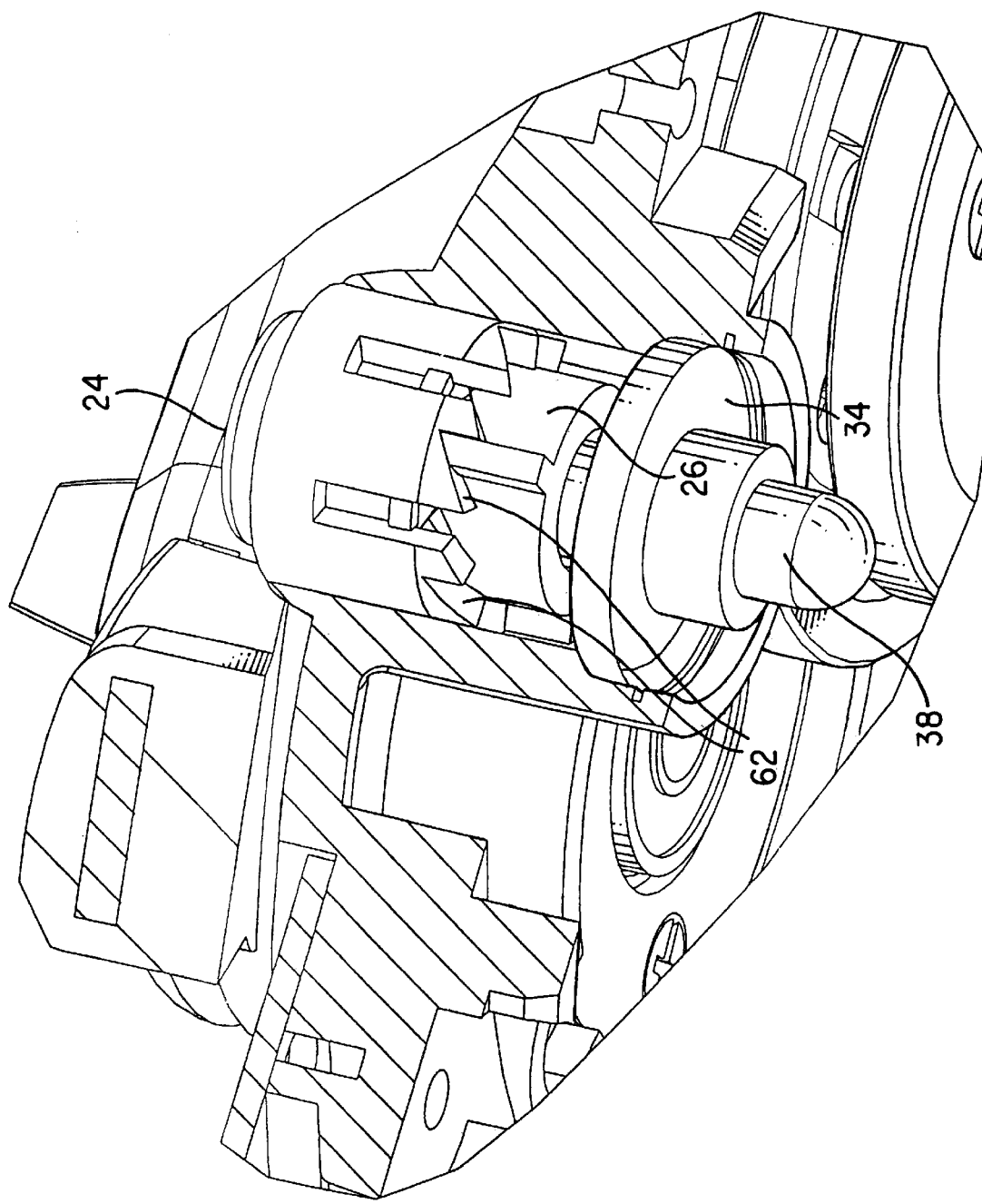
FIG. 7 is a perspective view partially broken away of a portion of the reel.
Figure 8:
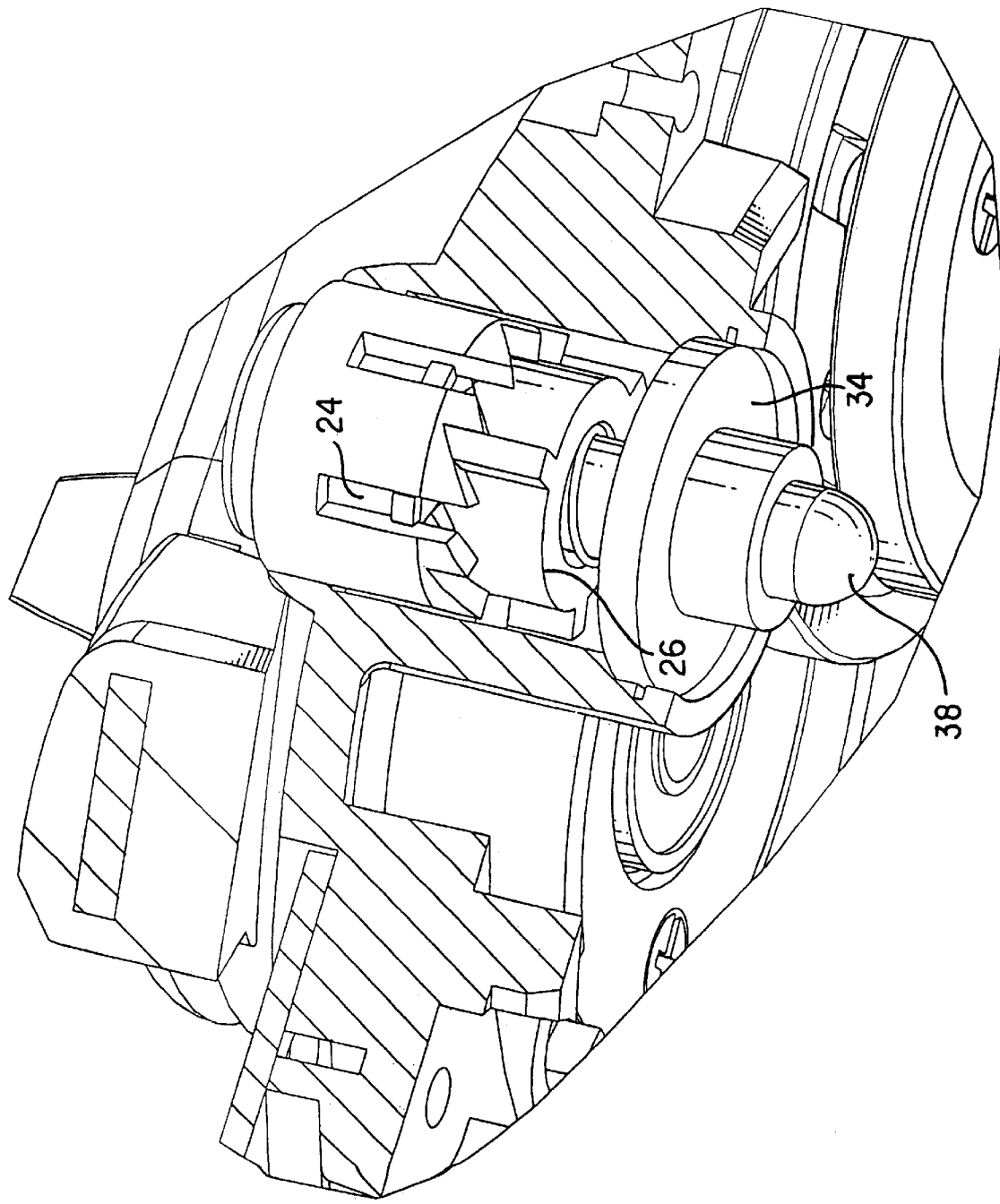
FIG. 8 is a perspective view partially broken away of a portion of the reel.

When the button is released, the ramps 60 on the tabs 32 of the selector 26 engage the ramps 62 of the cage 22 in response to the force of the spring 46 (see FIG. 6). This continues the clockwise rotation of the selector 26 until the point 61 (FIG. 3) of the tab 32 bottoms out in the vertex 63 (FIGS. 6, 7 and 8) of the ramp 62 on the cage 22; providing a third rotational restraint means. The click mechanism is now engaged (that is, the pin 38 is extended so that its end 40 engages the click plate).

Up until this point, the heavy click spring 48 is not compressed. The light return spring 46 has been providing the force to activate the mechanism. Now that the click mechanism is engaged, the heavy spring means which provides the force that keeps the click pin point 40 in contact with the click plate. When the click mechanism is engaged, the ramps 54 on the button and ramps 56 on the selector are in the same relative position as that shown in FIGS. 2 and 3. The button is released and fully extended outwardly.

Figure 9:
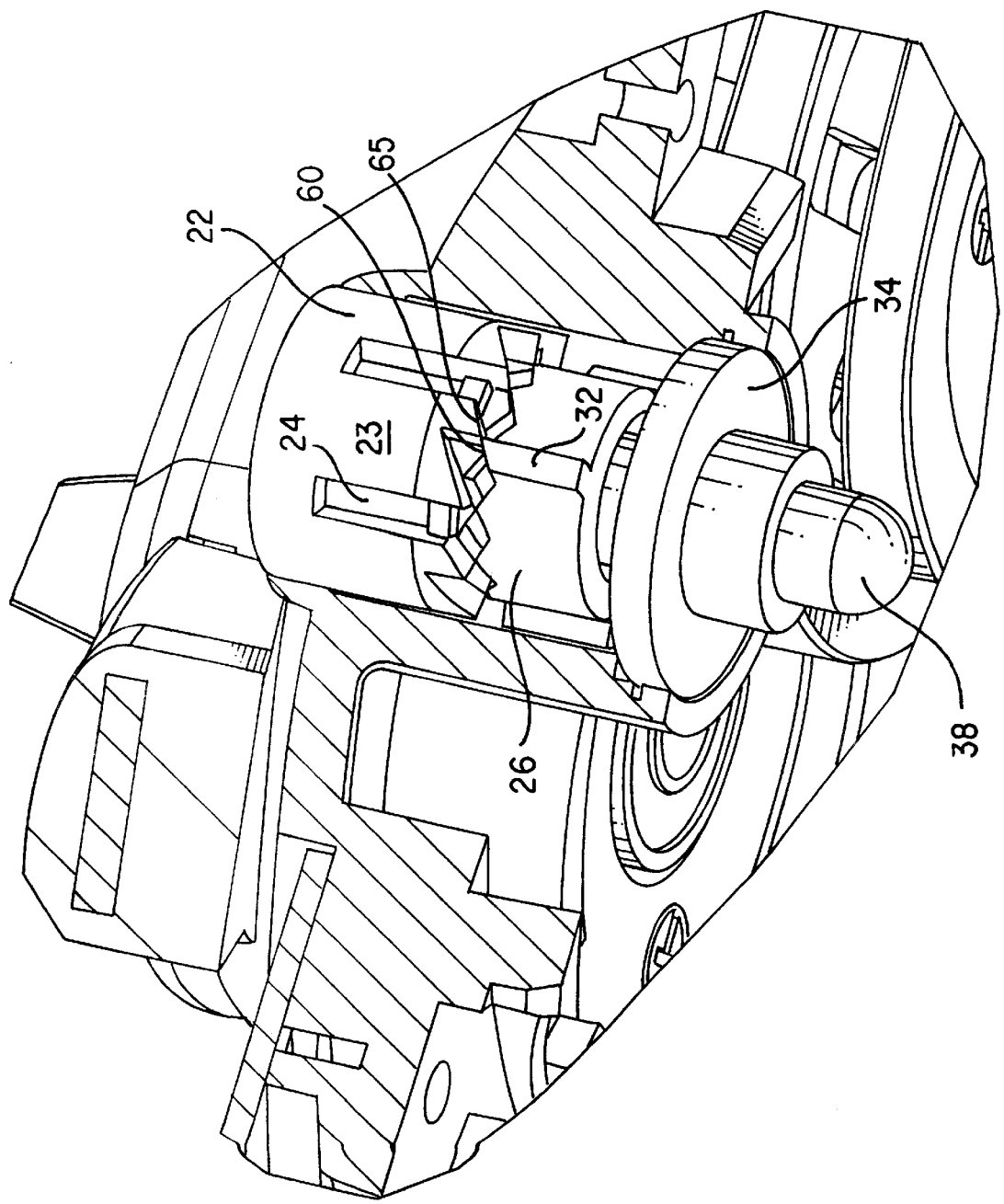
FIG. 9 is a perspective view partially broken away of a portion of the reel.
Figure 10:
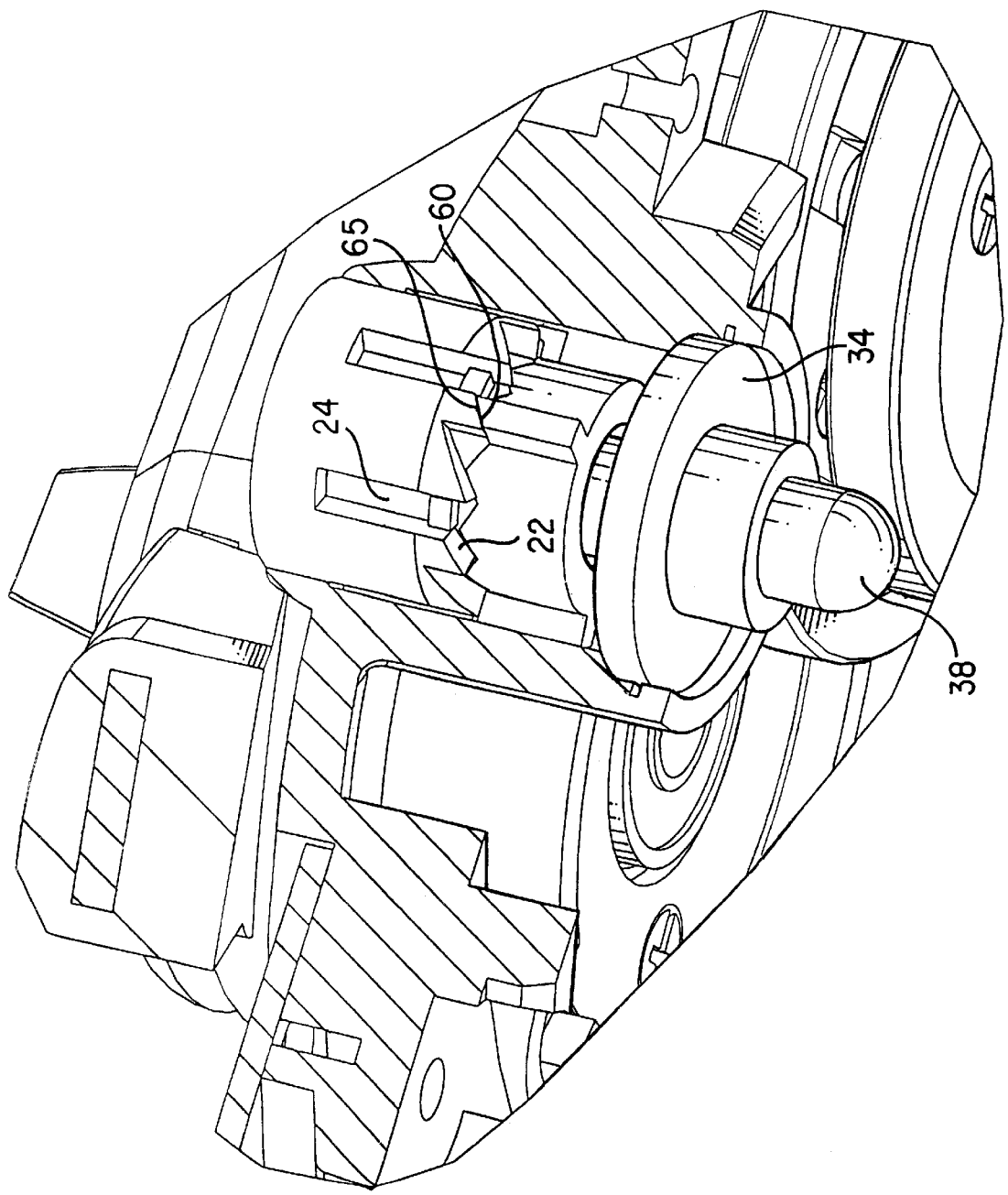
FIG. 10 is a perspective view partially broken away of a portion of the reel.
Figure 11:
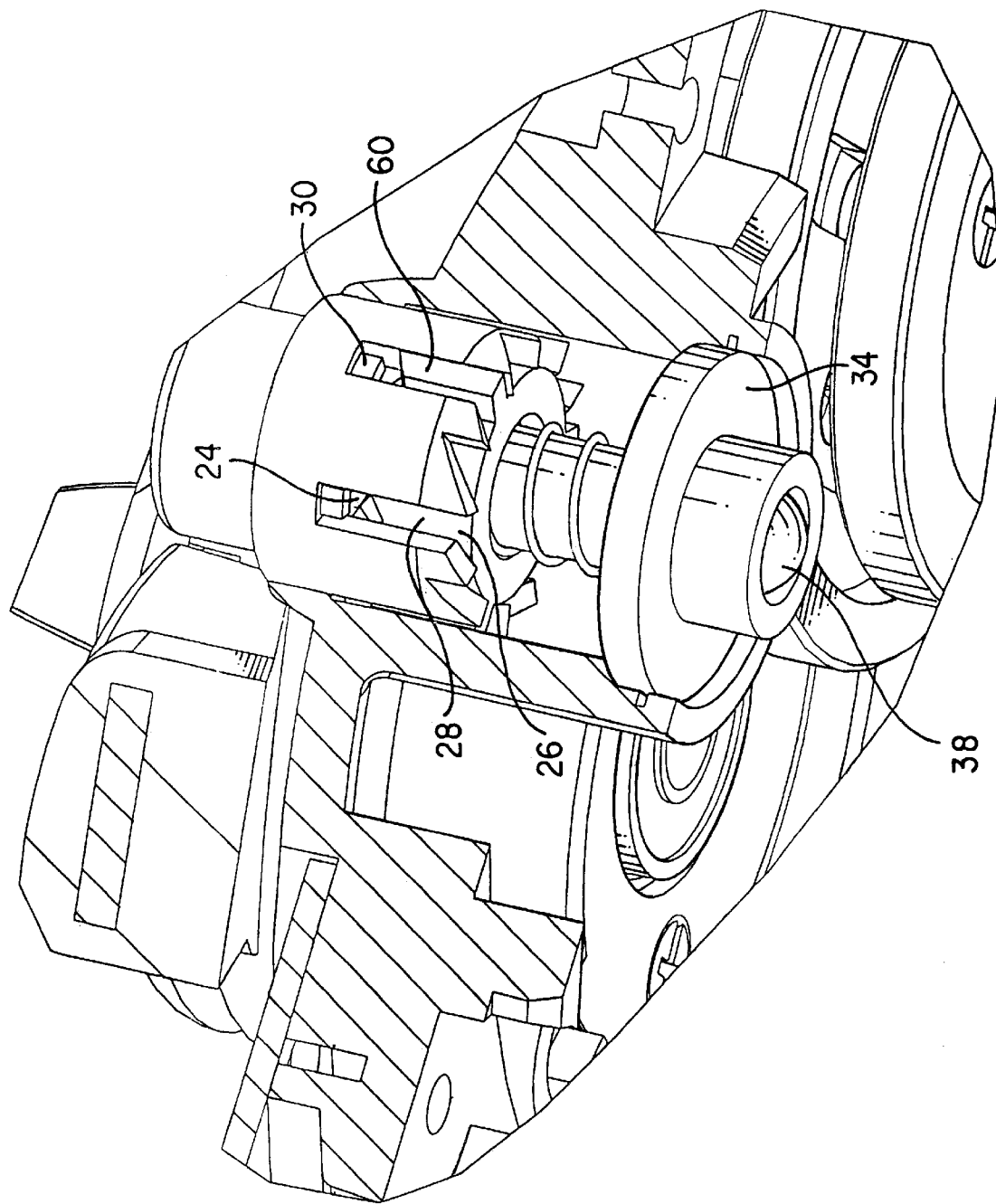
FIG. 11 is a perspective view partially broken away of a portion of the reel.

To disengage the click mechanism, the button 24 is pressed again. The process is the same as before. As the button moves axially inwardly, its ramps 54 engage the ramps 56 of the selector and move it inwardly until the tabs 32 clear the end of the cage 22 (see FIG. 9). The selector 26 is rotated by the ramps 54 on the button 24 and the ramps 56 on the selector, and as rotation continues, the ramps 60 on the tabs 32 of the selector follow the ramps 65 on the cage 22 (see FIG. 10) until the tabs 32 line up with the slots 28 in the cage 22. The light return spring 46 then forces the tabs 32 back into the slots 28 in the cage and forces the selector axially outwardly until the keys or tabs 30 on the button bottom out in the ends of the slots 28 in the cage 22 (see FIG. 11).

The motion of the selector is always controlled by the button and the cage. The combination of the light spring force and the ramps on the button and selector provide enough rotation to allow the ramps on the tabs of the selector to engage the ramps on the cage. These provide the rotation to reposition the button as shown in FIGS. 1 and 12.

What we claim is:

1. In a fishing reel having a click mechanism to engage and disengage a click, the improvement comprising:

a push button means for engaging said click mechanism to engage said click and to disengage said click;

said click mechanism further comprising a click pin and a plate positioned such that said click is engaged when said pin is engaged with said plate and disengaged when said pin does not engage said plate;

said push button means comprising:

a button means mounted on said reel having a button for inward and outward axial movement, and a plurality of teeth extending inwardly into said real, and a selector means mounted within said reel and positioned to be engaged by a portion of said push button means for axial movement in response to axial movement of said push button means, and further positioned to engage said click pin to cause movement thereof in response to movement of said selector means;

said selector means comprising a plurality of teeth juxtaposed to said teeth of said push button means to be engaged thereby upon inward axial movement of said push button means.

2. The fishing reel of claim 1 wherein: said push button means further comprises a first rotational restraint means engaging said push button means and said reel to restrain rotation of that portion of said button means which engages said selector means.

3. The fishing reel of claim 2 wherein:

said first rotational restraint means comprises a slot and at least one key in said slot.

4. The fishing reel claim 1 wherein:

the teeth of the button means and the teeth of the selector means are rotationally offset so that upon axial movement of said button means, the teeth of said button means and said selector means engage.

5. The fishing reel of claim 4 wherein:

second rotational restraint means are provided engaging said selector means and said reel to restrain the rotation of said selector means while permitting axial movement thereof.

6. The fishing reel of claim 5 wherein:

upon further axially inward movement of said button means, said second rotational restraint means is disengaged and said selection means is rotated.

7. The fishing reel of claim 6 wherein:

third rotational restraint means are provided engaging the selector means and the reel to prevent further rotation of said selector means while said click is engaged.

8. The fishing reel of claim 7 wherein:

upon further axially inward movement of said button means, said third rotational restraint means is disengaged and said selection means is rotated to a position wherein it can be moved axially outwardly and said click will be thereby disengaged.

9. The fishing reel of claim 8 wherein:

low strength spring means are provided engaging said selector means to exert an outwardly directed force thereon to cause said rotation, said axial movement of said selector means and said disengagement of said click.

10. The push button means of claim 7 wherein:

spring means of a higher strength than said low strength spring means are provided engaging said selector means to exert an inwardly directed force thereon to cause engagement of the click.

11. The fishing reel of claim 6 wherein:

low strength spring means are provided engaging said selector means to exert an outwardly directed force thereon to cause said rotation.

* * * * *